May 6, 1924.
H. E. VOSS ET AL
1,492,767
ANTISKIDDING DEVICE
Filed Jan. 20, 1920
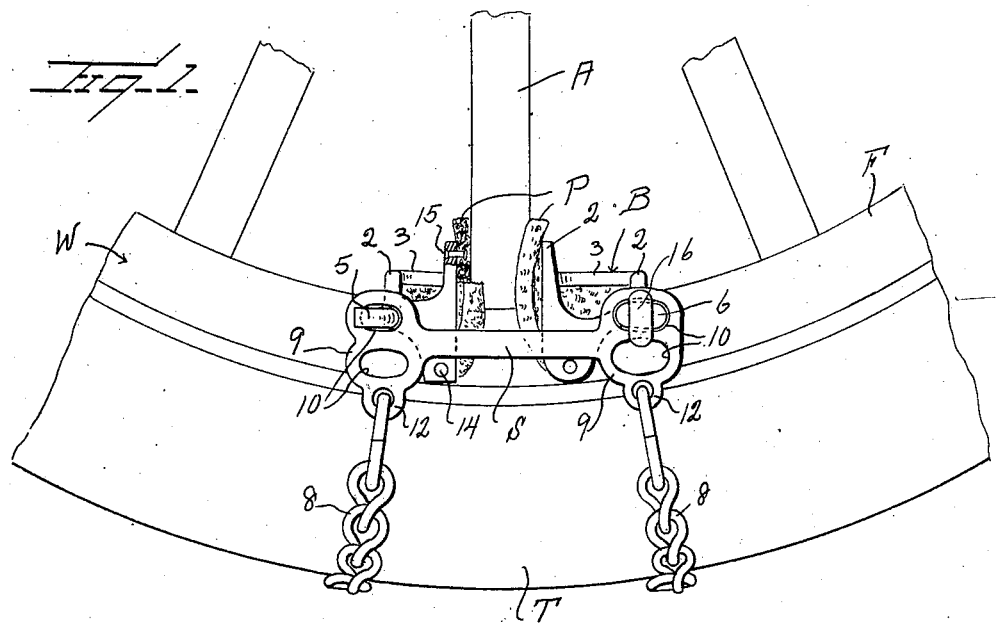
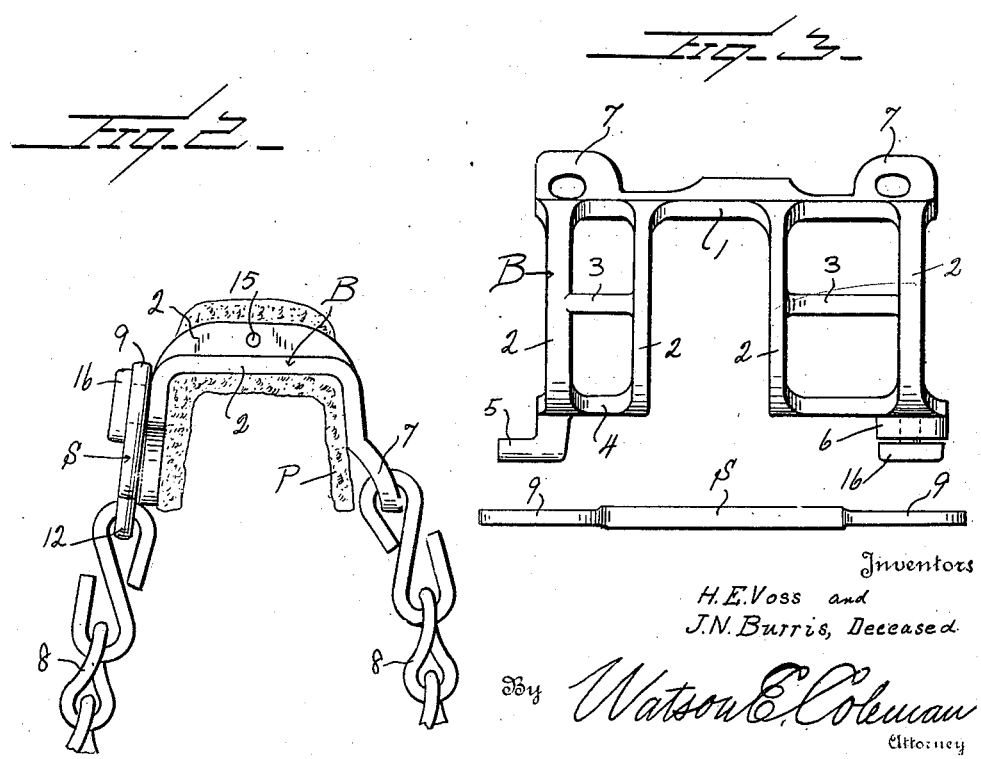
Inventors
H.E.Voss and
J.N.Burris, Deceased
By Watson E. Coleman
Attorney Patented May 6, 1924.

1,492,767

UNITED STATES PATENT OFFICE.

HENRY E. VOSS, OF DAVENPORT, IOWA, AND JAMES N. BURRIS, DECEASED; BY HENRY E. VOSS, ADMINISTRATOR.

ANTISKIDDING DEVICE.

Application filed January 20, 1920. Serial No. 352,867.

*To all whom it may concern:*

Be it known that HENRY E. VOSS, a citizen of the United States, residing at Davenport, in the county of Scott and State of Iowa, and JAMES N. BURRIS, late a citizen of the United States, deceased, did invent certain new and useful Improvements in Antiskidding Devices, of which the following is a specification, reference being had to the accompanying drawings.

This invention relates to certain improvements in anti-skidding devices, and it is an object of the invention to provide a novel and improved device of this general character which can be readily and conveniently applied with respect to the tread of a wheel structure and which operates effectively to maintain such wheel structure against skidding or slipping.

Another object of the invention is to provide a novel and improved device of this general character which coacts with a spoke comprised in a wheel structure whereby the device, when in applied position, is maintained in substantially a fixed position.

An additional object of the invention is to provide a novel and improved device of this general character which may be quickly and conveniently applied to a wheel structure without the necessity of raising said wheel or adjusting the same in any manner.

Furthermore, it is an object of the invention to provide a novel and improved device of this general character including a body member adapted to be engaged with the rim of a wheel structure and with a side portion of which is engaged a plurality of flexible members adapted to be disposed transversely around and over the tread portion of a tire together with a bar or strip to which said flexible members are also secured and which strip or bar is adapted to be detachably engaged with the opposite side portion of the body for maintaining the device, in its entirety, in applied position.

The invention consists in the details of construction and in the combination and arrangement of the several parts of the improved anti-skidding device whereby certain important advantages are attained and the device rendered simpler, less expensive and otherwise more convenient and advantageous for use, as will be hereinafter more fully set forth.

The novel features of the invention will hereinafter be definitely claimed.

In order that the invention may be the better understood, the same will be described with reference to the accompanying drawings, wherein:

Figure 1 is a view in side elevation of an anti-skidding device constructed in accordance with an embodiment of the invention and in applied position, a portion being broken away.

Figure 2 is a view in end elevation of the device as herein embodied, the flexible members being shown in fragment; and Figure 3 is a view in plan of the body of the device as herein embodied with the strip or bar separated therefrom.

As disclosed in the accompanying drawings, W denotes a wheel structure including the spokes A and a felly F, together with a tire T carried by the felly in any ordinary or preferred manner.

The improved device as herein disclosed comprises a body member B including a side bar 1 having extended laterally therefrom at longitudinally spaced points, the substantially U-shaped members or bars 2 as herein disclosed. The members 2 are four in number and each pair of adjacent members 2 at substantially the transverse centers thereof are connected by the longitudinally disposed bar 3, preferably integrally formed therewith and whereby the structure is materially strengthened or reenforced. The extremities or end portions of the bars or adjacent members 2 remote from the bar 1 are connected by the plates 4, preferably integrally formed therewith. The side portion of one of the plates 4 in close proximity to the outer bar 2 is provided with an angular lug 5 having its free end portion disposed in a direction away from the body B and in the same general direction as the longitudinal axis of the body B.

The second plate 4 at its outer end and in close proximity to the adjacent end bar 2 is provided with the substantially elliptical lug 6 having its major axis extending longitudinally of the body B.

The opposite end portions of the bar 1 are provided with the perforated ears 7 to afford means of connection for the flexible members or chains 8, said connections being substantially permanent.

S denotes a bar or strip having its opposite end portions transversely enlarged, as at 9, and each of said enlarged portions or plates is provided with a pair of transversely spaced openings 10, the openings 10 in one of the portions or plates 9 being of a size to substantially snugly receive the lug 6 and the openings in the opposite enlarged portion or plate being of a size to have readily inserted therethrough the angular lug 5.

The enlarged portions or plates 9 at the same side of the bar or strip S are provided with the perforated ears 12 to afford connection of the opposite end portions of the flexible members or chains 8 with said bar or strip S, said connections being also substantially permanent.

The inner bars 2 are preferably flattened with the flat faces thereof substantially perpendicularly related to the longitudinal axis of the body B. Arranged inwardly of each pair of adjacent bars 2 is a pad P, said pad being secured, as at 14, to the inner faces of the adjacent plates 4. The pad also extends between the two inner bars 2 and is anchored, as at 15, to the inner face of one of said bars 2.

In practice, the body B is applied to the felly F from within and with a spoke A positioned between the inner bars 2. The body B is applied to the felly F by a lateral movement with respect to the wheel structure W and the spoke A readily enters between the inner bars 2, owing to the fact that the space between said inner bars 2 from the side of the body B remote from the bar 1 is free and unobstructed except by the pads P.

The flexible members or chains 8 are then arranged over the tread portion of the tire T and the lug 5 disposed through an opening 10 in an end portion of the strip or bar S and the lug 6 engaged in an opening 10 at the opposite end of said strip or bar S.

When the lug 6 is arranged within an opening 10, the angular lug 5 sufficiently overlies the bar or strip S or the adjacent and enlarged portion or plate 9 to hold said end portion of the strip or bar S against displacement.

Rotatably engaged with the outer face of the lug 6 is a headed member 16 which, when disposed transversely of the strip or bar S, overlies the adjacent portion of said strip or bar and more particularly an enlarged portion or plate 9 whereby the strip or bar S is effectively maintained against displacement and the device, in its entirety, properly held in working position. When the headed member 16 is in its second position or in a position extending longitudinally of the bar or strip S, said bar or strip can be readily and easily removed as said member 16 freely passes, when in this second position, through the coacting opening 10.

The flexible members or chains 8 are of requisite length but by having the openings 10 in each of the enlarged portions or plates 9 in spaced relation transversely of the bar or strip S, it will be readily understood that an adjustable connection is afforded between the strip or bar S and the body B as may be required by the necessities of practice and which particularly permits a single device to be employed in connection with wheel structures wherein the tires T are of different sizes.

The pads P are of particular advantage and importance in preventing the device, when applied, from scratching or otherwise marring the surface of the felly F with which the device coacts and which, at the same time, possesses a certain amount of compression whereby the maintenance of the device in working position is materially facilitated.

Any number of the improved devices may be employed in connection with a single wheel structure but in practice, it is best to employ four of these devices with the same substantially equidistantly spaced.

From the foregoing description, it is thought to be obvious that an anti-skidding device constructed in accordance with this invention is particularly well adapted for use by reason of the convenience and facility with which it may be assembled and operated, and it will also be obvious that the invention is susceptible of some change and modification without departing from the principles and spirit thereof, and for this reason it is not to be understood as limiting the invention to the precise arrangement and formation of the several parts herein shown in carrying out the invention in practice except as hereinafter claimed.

I claim:—

1. An anti-skidding device comprising a body adapted to engage the felly of a wheel structure inwardly of the tire and locking with a single spoke of the wheel, flexible members engaged with one side of the body, and a strip adapted for detachable engagement with the opposite side portion of the body and to which the flexible members are also connected, said flexible members, when the strip is attached to the body, extending across the tread of the tire of a wheel structure.

2. An anti-skidding device comprising a body adapted to engage the felly of a wheel structure inwardly of the tire, flexible members engaged with one side of the body, and a strip adapted for detachable engagement with the opposite side portion of the body and to which the flexible members are also connected, said flexible members, when the strip is attached to the body, extending across the tread of the tire of a wheel structure, said body being provided with a transversely extending pocket open at the side of the body with which the strip coacts, a spoke of the wheel structure being received within said pocket when the device is applied.

3. An anti-skidding device comprising a body adapted to engage the felly of a wheel structure inwardly of the tire and locking with a single spoke of the wheel, flexible members engaged with one side of the body, and a strip adapted for detachable engagement with the opposite side portion of the body and to which the flexible members are also connected, said flexible members, when the strip is attached to the body, extending across the tread of the tire of a wheel structure, the connection between the strip and the body being adjustable in a direction transversely of the strip.

4. An anti-skidding device comprising a body adapted to engage the felly of a wheel structure inwardly of the tire, flexible members engaged with one side of the body, and a strip adapted for detachable engagement with the opposite side portion of the body and to which the flexible members are also connected, said flexible members, when the strip is attached to the body, extending across the tread of the tire of a wheel structure, said body being provided with a transversely extending pocket open at the side of the body with which the strip coacts, a spoke of the wheel structure being received within said pocket when the device is applied, and pads carried by the opposite end portions of the body for contact with the wheel structure, said pads also extending within the pocket for contact with the spoke.

5. An anti-skidding device comprising a body adapted to engage the felly of a wheel structure, a side portion of the body being provided with a pair of longitudinally spaced lugs, flexible members engaged with the opposite side portion of the body, and a strip with which said flexible members are also secured, the opposite end portions of the strip being provided with openings to receive the lugs of the body, and strip retaining means carried by the lugs.

6. An anti-skidding device comprising a body adapted to engage the felly of a wheel structure, a side portion of the body being provided with a pair of longitudinally spaced lugs, one of said lugs being angular, flexible members engaged with the opposite side portion of the body, and a strip with which said flexible members are also secured, the opposite end portions of the strip being provided with openings to receive the lugs of the body, the angular lug affording retaining means for the strip, and retaining means carried by the second lug and movable with respect thereto.

7. An anti-skidding device comprising a body including a side bar, transversely directed bars secured at similar extremities to the first named bar, said second named bars being adapted to extend across the inner face of the felly of a wheel structure, the end portions of a pair of adjacent of said second named bars at each end of the body and remote from the first named bar being connected by a plate, the space between an inner pair of adjacent of said second named bars being open at the side of the body remote from the first named bar and adapted to receive a spoke of a wheel structure, a strip detachably engaged with the plates and extending across the open end portion of the space when said strip is in applied position, and flexible members secured to the first named bar and to the strip and adapted to extend across the tread of the tire of a wheel structure when the strip is in engagement with the plates.

8. A non-skid device embodying a saddle to fit a wheel felly, having a transverse slot opening at one side to receive a spoke, an attaching bar extending along said side of the saddle across said slot, said saddle and bar having means for detachably connecting them together, and anti-slipping means connected to said bar and the opposite side of the saddle to extend across the tire.

9. A non-skid device comprising a saddle to fit a wheel felly, provided with outstanding lugs, one of which is hook-shaped, an attaching bar having a slot to engage said hook-shaped lug and having another slot to engage the other lug when the bar is moved longitudinally into engagement with the hook-shaped lug, manually operable means carried by the last named lug for holding the bar thereon, and anti-slipping means connected to said bar and saddle.

10. A non-skid device comprising a saddle to fit a wheel felly, having an outstanding longitudinal lug at one side and a hook-shaped lug at said side extending away from the longitudinal lug, an attaching bar having slots, one to engage said hook-shaped lug, and the other to fit over the longitudinal lug after the bar is shifted longitudinally into engagement with the hook-shaped lug, a rotatable latch member carried by the longitudinal lug having a T-head movable into alinement with and at an angle with the longitudinal lug, and anti-slipping means connected to said bar and opposite side of the saddle.

In testimony whereof I hereunto affix my signature.

HENRY E. VOSS.
*For himself and as administrator of the estate of James N. Burris, deceased.*